Oct. 13, 1953   P. B. CLARK   2,655,591
LIGHT PROJECTOR FOR AIRPORT LIGHTING
Filed June 1, 1950   2 Sheets-Sheet 1

PHILIP B. CLARK
INVENTOR.

BY
ATTORNEY

Oct. 13, 1953 P. B. CLARK 2,655,591
LIGHT PROJECTOR FOR AIRPORT LIGHTING
Filed June 1, 1950 2 Sheets-Sheet 2

PHILIP B. CLARK
INVENTOR.

BY *Charles A. Tindell.*
ATTORNEY

Patented Oct. 13, 1953

2,655,591

UNITED STATES PATENT OFFICE 2,655,591

LIGHT PROJECTOR FOR AIRPORT LIGHTING

Philip B. Clark, Stroudsburg, Pa., assignor to McGraw Electric Company, Milwaukee, Wis., a corporation of Delaware Application June 1, 1950, Serial No. 165,497

8 Claims. (Cl. 240—1.2)

1

The present invention relates to light projectors, and more particularly to projectors for signaling and guiding approaching vehicles, aircraft, or ships.

The broadest application of the present invention may be found in signaling and guiding aircraft during landing and take-off operations. These operations require angular projection of light rays from both vertical and horizontal planes. However, it is fully within the province of the present invention to incorporate the novel light projector as a means for guiding approaching land and naval craft, which receive light signals on a horizontal plane only. Also, in the case of airport lighting, the novel projector may be modified for use as a taxiway signal light. When used for this purpose, signals need only be projected on a horizontal plane as taxiway signals are used for guiding airplanes at ground level, after they have been safely landed.

As far as aircraft signaling is concerned, the novel projector may readily be used with the airport lighting system disclosed in U. S. Patent No. 2,155,295 granted to John B. Bartow on April 18, 1939. This system is particularly adaptable for guiding aircraft to a safe landing and take-off under conditions of low or poor visibility.

For guiding aircraft pilots to remote distances, modern radio-range equipped airways are highly effective. And, after the radio-range station is reached, an instrument approach system may be used to bring the aircraft to a position from which a landing can be made. But, during the critical last part of the approach below established minima, only visual contact with the ground or with the lights of the airport can give the pilot the accuracy and sureness he needs to bring the plane in.

With modern landing speeds, actual blind landing is difficult and undesirable. But, according to the teachings of the above mentioned U. S. patent, high intensity lights, with properly controlled light distribution can be arranged to guide the pilot visually to a safe landing. In order to properly orient the approaching pilot, he must also have a visual perspective of the groundplane. In daylight and fair weather, the appearance of the horizon, airport runway, and landmarks create perspective, but at night, or during low visibility, the pilot must rely on an arrangement of runway lights, such as that taught by the above patent, to supply perspective.

It is an object of the present invention to provide a light projector that may be conveniently adapted for signal purposes in either a horizontal

2 plane or a vertical plane, or a combination of both planes.

Another object of this invention is to provide a light projector that is readily incorporated in systems for visually guiding aircraft during landing and take-off operations under conditions of low or poor visibility.

A further object of this invention is to provide an inexpensive light projector for visually guiding aircraft to and from airports where the relatively small amount of traffic will not warrant large expenditures for elaborate equipment, and yet for safety reasons, require adequate visual signals under conditions of low visibility.

Still another object of this invention is to provide a novel light projector that may be used simultaneously for signal purposes and for illumination of roadways or airport runways and taxiways without the necessity of providing additional lenses other than those provided for projection of signal light.

In the accompanying drawings.

Like parts are designated by the same reference numerals throughout the several views.

Figure 1:
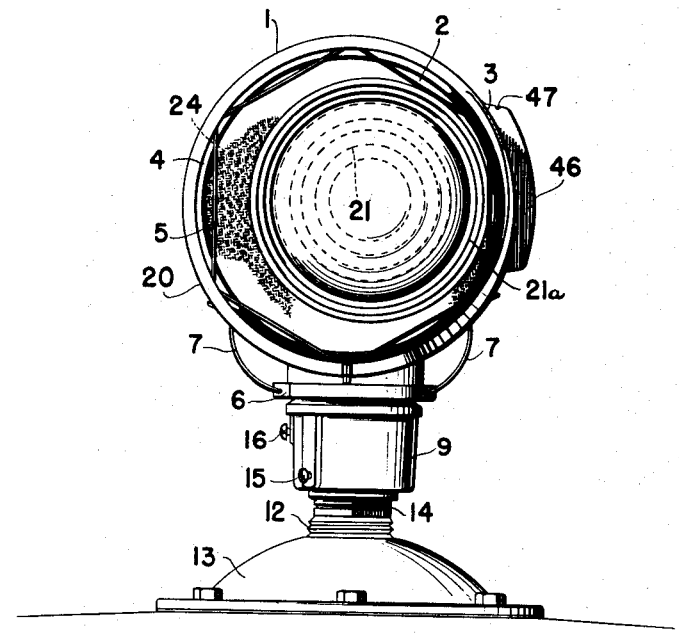
Fig. 1 is a front elevational view of the light projector of which the view of the opposite side would be substantially identical and in left-hand relationship.

Referring to Figs. 1 thru 4, housing 1 is preferably provided with two lenses 2 and two light control shields 3. The lenses are held in position by means of a lens gasket 4 and a novel lens retaining spring 5. The lens housing is supported by a socket mounting casting 6. The housing and casting are held together by means of latch springs 7, which are conveniently brought into engagement with the depressed portions 8 of housing 1. This manner of latching is provided in order to make the internal parts more easily accessible. It will be readily seen that the housing 1 may be easily removed from the casting in inclement weather without the need for tools, nor the necessity for removing gloves.

Figure 4:
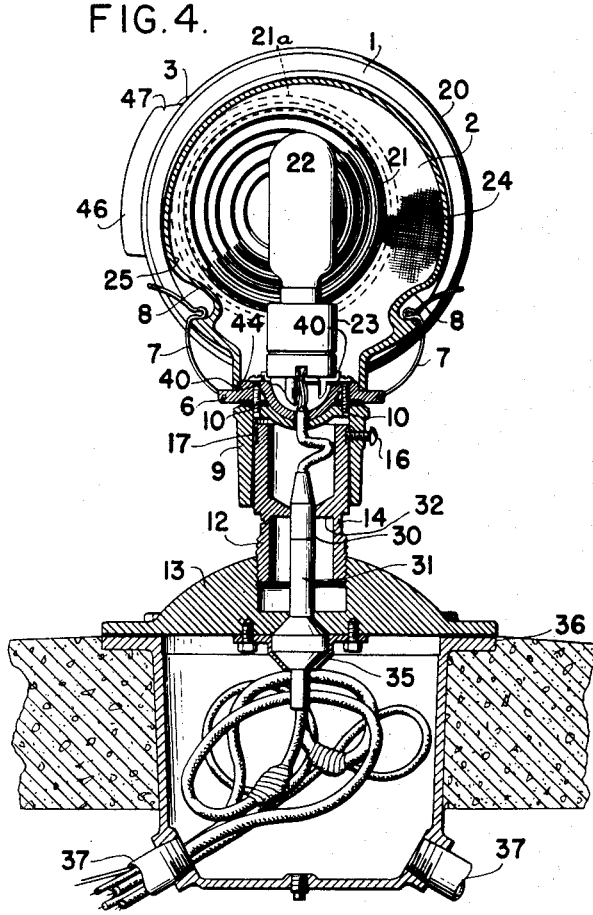
Fig. 4 represents a sectional elevation of the novel light projector.

The housing and casting 6 rest upon slip-fitter casting 9, being fastened thereto with machine screws 10. Referring to Fig. 4, it may be seen that the castings 6 and 9 provide a ball and socket joint for leveling and aligning the lamp assembly. The slip-fitter casting 9 slips over break-off adapter 12 which is provided with external threads for engagement with the complementary threaded opening in base plate 13. The break-off adapter 12 is preferably provided with an annular break-off groove 14, or some other means, for making the adapter relatively more frangible than the housing 1 positioned thereon. Thus, if a vehicle, airplane or a snowplow should accidently collide with the novel projector, the adapter will break off at the break-off groove 14 rather than at portions which are to be protected. The casting 9 and break-off adapter 12 are further held in engagement with machine screws 15 and retaining screw 16. The retaining screw 16 is brought into engagement with annular groove 17 of adapter 12.

A description of the novel means for light projection will be made with reference to Figs. 1 thru 4. The light projector as shown in the drawings is a bi-directional unit provided with two lenses 2. However, the projector may be readily modified to use only one lens (not shown).

The following description will be limited to one lens portion, but will hold true equally well for the opposite lens and light signals projected therefrom. In order to incorporate the present invention in the system described in the above mentioned Patent No. 2,155,295, a means for projecting light signals at both horizontal and vertical elevations must be provided. Under this system, light projectors are oppositely placed on either side of an airport runway in left and right-hand relationship. Assuming a fixed-focused light source in either of these opposed projectors, a predetermined junction point is established for emitted light signals. This junction point is determined for reception of signals under conditions of minimum visibility. Such conditions may be exemplified by a thick fog during daylight hours. It will be apparent that in order to receive light signals, a high-intensity light source must be used. To enhance this high-intensity projection, companion runway lights such as those provided herein, are arranged to "cone in" at predetermined angles from the horizontal and vertical planes. Thus, the light signals from companion projectors will intersect and provide a point source of high-intensity light at an elevated plane. Under the above mentioned patent, a series of these sets of runway lights are positioned along a given length of runway.

The novel light projector readily provides the desired degree of "coning in" by the unique combination of lens mounting and positioning of projection prisms on said lens.

Figure 2:
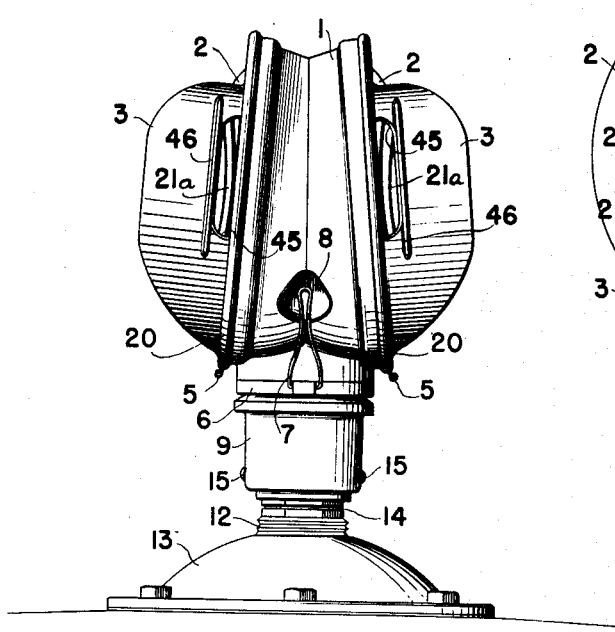
Fig. 2 is a side elevational view of the novel projector as used for projecting light signals on a vertical plane as required in aircraft signaling.

Referring to Figs. 1 and 2 it will be apparent that a novel means has been provided for "coning in" projected light signals. The preferred manner of "coning in" is as shown in the above-mentioned drawing figures; that is, by a combination of an eccentric positioning of the light refracting portion of the lens 2 on the lens surface and by positioning the axis of the housing opening 20 at a predetermined vertical angle. This eccentric position is readily established by using a "bull's-eye" lens. As shown here, the bull's-eye is the inner-most annular prism of the concentric annular refracting prisms 21 on the inner surface of the lens 2. The lens 2 is shown with additional concentric annular refracting prisms 21-a on the outer surface. The principal axis of the focusing portion is angularly disposed relative to the axis of the housing opening 20.

It will be apparent that any combination of vertical and horizontal coning angles may be established by inclining the axis of the light refracting portions 21 and 21-a, away from either, or both, the horizontal or vertical planes. It is also within the province of this invention to provide angular light projections by holding the axis of the light refracting portions substantially parallel with the axis of the opening 20, and positioning the axis of the opening at desired angles.

Figs. 1 thru 4 show the preferred embodiment with a combination of an eccentrically positioned bull's-eye refraction portion 21 and 21-a providing light projection on an angular horizontal plane to intersect a projected surface outline of the shield 3. The angular light projection towards the vertical is herein obtained by angular positioning of the opening 20 towards the vertical.

Figure 6:
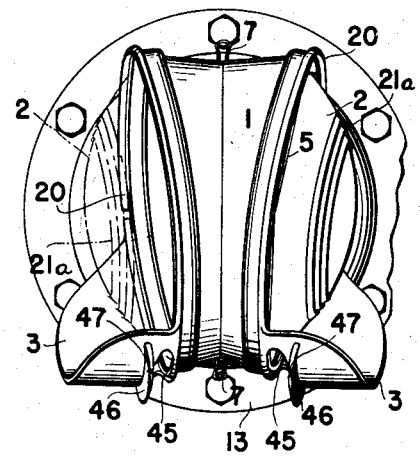
Fig. 6 is a top plan view of a modified form of the novel projector.

Referring to Fig. 6, a modification of the projection is shown with the axis of the opening 20 angularly positioned in both vertical and horizontal directions. This modification is shown with the principal axis of the lens 2 substantially parallel to the axis of the opening 20. However, a large variety of angles may be obtained by moving both the principal axis of the lens 2 and the axis of the opening 20 in either, or both, vertical and horizontal directions. Or, one axis may be held constant and the other positioned in either, or both, vertical and horizontal directions.

Figure 3:
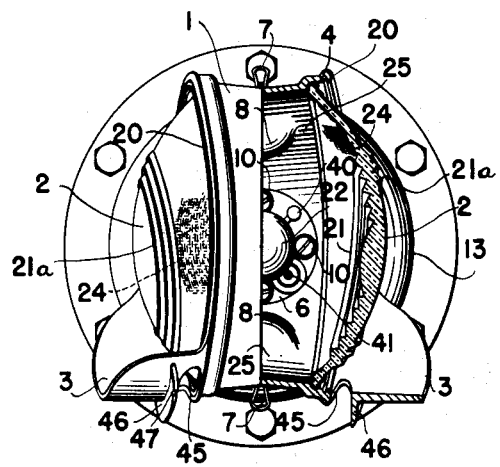
Fig. 3 is a top plan view, partially in section of the present invention.

The light source for the novel projector is shown in Figs. 3 and 4 as a standard projection lamp 22 mounted in lamp socket 23. In order to take advantage of a pin-point source of light, diffusing prisms 24 are provided. These prisms may be made in one of several well known ways. A convenient manner of providing diffusing prisms is to impress a multitude of crossed lines on either the inside or outside surface of the lens, or both surfaces. The prisms also diffuse any extraneous light rays, and accordingly reduce glare as the pilot approaches the lamp.

In order to prevent entrapment of any light rays, the inner surfaces 25 of the housing 1 may be cast in a slanted manner. Thus, all light emitted from the lamp 22 is reflected through the lenses 2. Besides taking advantage of as much of the beneficial light rays as possible, the projector will operate at a cooler temperature when the surfaces 25 are cast thusly. To enchance the reflective qualities of the surfaces 25, they may be coated with aluminum paint, or some other suitable coating. However, the housing 1 may be conveniently die-cast of aluminum, magnesium alloy, or any other convenient metal which will provide a smooth surface—one that will serve as a reflector without the necessity of additional coatings.

Thus, it will be seen that a very convenient arrangement for light projection on both a horizontal and vertical plane has been provided for a fixed focus light source. As visibility conditions become alternately poorer or better the intensity of the light source may be changed accordingly by control of the electrical current to that source.

These controls are well known and are not shown herein. The intensity of the light also may be increased or decreased according to the wishes of the approaching pilot, in that human beings react differently to various degrees of light intensity. Where installations require intermittent light signals, a means (not shown) for providing a quick "make and break" electrical circuit may be used.

A novel method of breaking the electric circuit is provided. Fig. 4 clearly shows male and female plugs 30 and 31, respectively. These plugs are preferably made of approximately the same external dimensions as the internal dimensions of the adapter 12, or as shown with an integral inner shoulder 32 of adapter 12. The junction of the plugs is preferably positioned at or close to the frangible break-off groove 14 of the adapter 12. Thus, if the projector is accidently knocked over, the adapter 12 will break at the groove 14, and accordingly disengage the electrical plugs 30 and 31. It will also be seen that a close fit of the plugs 30 and 31 will provide a water-tight structure. To further insure a water-tight fit, the plug 31 may be made as shown. Here, a generally conical shape is made to conform to the inner surface of the plug retaining cup 35 which is fitted in the underside of base plate 13.

The projector is conveniently mounted upon supporting receptacle 36, which may be embedded in concrete as shown in Fig. 4. The receptacle 36 may also house a small transformer (not shown) if so desired. For underground wiring installations the electrical leads are conveniently positioned in conduits 37.

Figure 7:
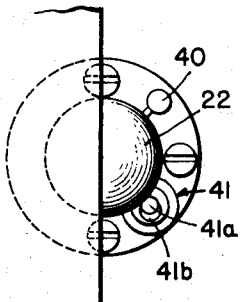
Fig. 7 is an enlarged fragmentary view showing the spirit level structure.
Figure 5:
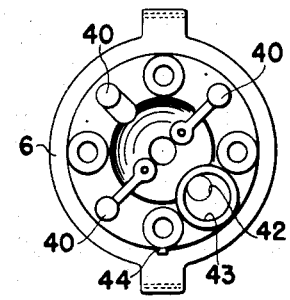
Fig. 5 is a top plan view of the socket mounting casting, shown without the addition of a spirit level.

The novel projector is aligned and leveled in an expeditious manner which is disclosed in Figs. 3 and 5. Casting 6 may be provided with at least 3 leveling posts 40 and/or spirit level 41. The posts 40 are made integral with the casting 6, and the leveling operation may be conveniently made by resting a carpenter's level (not shown) thereon. The carpenter's level is rested on two leveling posts 40 and screws 10 are adjusted accordingly. As the carpenter's level is shifted to other of the remaining level posts 40, the appropriate screws are tightened and loosened with the casting 6 shifting in position in the ball and socket joint provided by the casting 6 and slipfitter casting 9. If so desired, a spirit level 41 may be provided for leveling purposes. The spirit level is shown in Figs. 3 and 7. Referring particularly to Fig. 7 the spirit level 41 is of well known form comprising a cup-like member closed at its open end with a transparent cover of glass or plastic. The cover is appropriately provided with a leveling reference mark 41a etched or printed on the cover surface, and is used to indicate a level condition of the projector when the bubble 41b is positioned concentrically therewith. Referring to Fig. 5, it will be seen that an opening 42 is provided in casting 6. This opening permits entrance of a tool such as a screw-driver, for forcing the inserted spirit level from the recessed portion 43. Thus, the spirit level which may be held in place with any bonding agent such as plaster of Paris or cement, may be readily removed if it should be damaged.

After the casting 6 has been leveled, the housing 1 is positioned thereon by means of indexing notch 44 of said casting and the corresponding indexing groove (not shown) of said housing. As stated above, the housing is held in place by engaging latch springs 7 with the depressed portions 8 of housing 1.

A very novel means is provided for controlled illumination of the roadway or runway located between companion projectors.

In the case of airport signal lighting, the runway should not be intensely illuminated, in order that a relatively darker area between a series of projections placed on a runway may be seen by the pilot of a landing plane. Thus, he may have the proper visual perspective of the ground-plane to guide the plane to a safe landing. If the runway surface between companion projections is too well lighted, the contrast needed for obtaining visual perspective will be greatly diminished. The amount of illumination to the surface between projectors may be controlled by providing apertures 45 and projecting ribs 46 in light controlled shields 3. Thus, projected light emanated from lenses 2 is shielded from illuminating said roadway or runway by shields 3. The desired amount of illumination is emitted through apertures 45, and further controlled with the use of projecting ribs 46.

Protection of projection lenses in airport lighting has long been a problem. These light projectors are always placed in open areas where they are subjected to constant abrasive conditions. Abrasive action of sand storms has been further enhanced by gravel and stones that are "kicked up" by passing airplanes, or the "wash" produced by revolving propellers. This protection is conveniently provided by the light control shields 3. Any gravel, sand or stones that are normally forced towards the projector are shielded from the lenses 2.

A very convenient means for "lining up" a row of the novel light projectors is provided. The projecting ribs 46 are provided with a sighting notch 47. This notch may also be in the form of a small opening (not shown) in the projecting portions 46. Thus, it will be readily seen that the rows of light may be "lined up" by sighting through the notch, or opening 47, to the notch of the remaining projectors on one side of the roadway, runway or taxiway.

The novel projector may be conveniently provided with lenses of various colors, or with color screens placed between the lamp and the lens (not shown). Colored lenses are provided for signaling purposes, and in a dual lens unit as shown, a different color may be used in each lens. This may be effectively illustrated where the projector is used to indicate to the pilot that he is approaching the runway from the wrong direction. Thus, all lenses of a series of dual lens projectors facing the one direction will be red, or other appropriate color. Also, safe or caution areas may be indicated with green or yellow colored lenses respectively. Color, itself, is not a factor in penetration of fog, as all colors apparently penetrate fog, snow, or rain equally well.

It can be appreciated from the foregoing, that the full disclosure of the novel projector of this invention can be facilely adapted to most advanced airport lighting methods, and has wide application to other signaling systems. Therefore, it is to be limited only by the clear import of the following claims.

I claim:

1. In a signal light projector comprising a housing having an annular opening and a light cutoff shield adjacent said opening at one side thereof, said shield having an aperture adjacent said opening for permitting a limited quantity of light radially of said opening; an annular lens in said opening having a bull's-eye portion encircled by annular refracting prisms concentric therewith, the axis of said bull's-eye and prisms disposed angularly relative to the geometric axis of said opening and the lens and directed toward a projected surface of said shield.

2. In a signal light projector comprising a housing having opposed annular openings and a light cutoff shield adjacent each of said openings at one side thereof, each shield having an aperture adjacent its respective opening for permitting a limited quantity of light radially of said opening; an annular lens in each of said openings having a bull's-eye portion encircled by annular refracting prisms concentric therewith, the axis of said bull's-eye and prisms disposed angularly relative to the geometric axis of said opening and lens and directed toward a projected surface of its respective shield.

3. In a signal light projector comprising a housing having an annular opening and a light cutoff shield adjacent said opening at one side thereof, said shield having an aperture adjacent said opening for permitting a limited quantity of light radially of said opening; an annular lens in said opening having a bull's-eye portion encircled by annular refracting prisms concentric therewith, the axis of said bull's-eye and prisms disposed angularly relative to the geometric axis of said opening and the lens and directed toward a projected surface of said shield, the geometric axis of said opening being inclined away from the horizontal.

4. In a signal light projector comprising a housing having opposed annular openings and light cutoff shields adjacent each of said openings at one side thereof, said shields each having an aperture adjacent its respective opening for permitting a limited quantity of light radially of said opening; an annular lens in each of said openings having a bull's-eye portion encircled by annular refracting prisms concentric therewith, the axis of said bull's-eye and prisms disposed angularly relative to the geometric axis of said opening and lens and directed toward a projected surface of said shield, said openings each being inclined away from the horizontal.

5. In a signal light projector comprising a housing having an annular opening and a light cutoff shield adjacent said opening at one side thereof, said shield having an aperture adjacent said opening for emitting a limited quantity of light radially of said opening; an annular lens in said opening having a bull's-eye portion encircled by annular retracting prisms concentric therewith, the remaining portion of said lens comprising a light diffusing surface, the axis of said bull's-eye and prisms disposed angularly relative to the geometric axis of said opening and lens and directed toward a projected surface of said shield.

6. In a signal light projector comprising a housing having an annular opening and a light cutoff shield adjacent said opening at one side thereof, said shield having a aperture adjacent said opening for emitting a limited quantity of light radially of said opening; an annular lens in said opening having a bull's-eye portion encircled by annular refracting prisms concentric therewith, the remaining portion of said lens comprising a light diffusing surface, the axis of said bull's-eye and prisms disposed angularly relative to the geometric axis of said opening and lens and directed toward a projected surface of said shield.

7. In a signal light projector comprising a housing having an annular opening and a light cutoff shield adjacent said opening at one side thereof, said shield having an aperture adjacent said opening for emitting a limited quantity of light radially of said opening; an annular lens in said opening having a light refracting portion, the angle of refraction of said portion being angularly disposed relative to the geometric axis of said opening and lens and directed toward a projected surface of said shield.

8. In a signal light projector comprising a housing having an annular opening and a light cutoff shield adjacent said opening at one side thereof, said shield having an aperture adjacent said opening for emitting a limited quantity of light radially of said opening and a projecting rib adjacent said aperture; an annular lens in said opening having a light refracting portion for directing light at an angle intersecting a projected surface of said shield and having its angle of refraction angularly disposed relative to the geometric axis of said opening and lens.

PHILIP B. CLARK.

References Cited in the file of this patent

UNITED STATES PATENTS

| Number | Name | Date |
|---|---|---|
| 351,609 | Macbeth | Oct. 26, 1890 |
| 1,566,119 | Reed | Dec. 15, 1925 |
| 1,573,451 | Rein | Feb. 16, 1926 |
| 1,584,070 | Applequist | May 11, 1926 |
| 1,658,549 | Blackmore | Feb. 7, 1928 |
| 2,017,052 | Bartow | Oct. 15, 1935 |
| 2,058,743 | Trippe | Oct. 27, 1936 |
| 2,257,232 | Flint et al. | Sept. 30, 1940 |
| 2,261,978 | Dirksen | Nov. 11, 1941 |
| 2,360,138 | Johnson | Oct. 10, 1944 |
| 2,431,240 | Gausch | Nov. 18, 1947 |
| 2,501,437 | Cline et al. | Mar. 21, 1950 |

OTHER REFERENCES

Airfield Lighting, Final Report for 1947, page 12.